Oct. 23, 1951  C. J. HIRSCH  2,572,725
PATH-INDICATING SYSTEM FOR MOBILE CRAFT
Filed Feb. 15, 1946  3 Sheets-Sheet 1
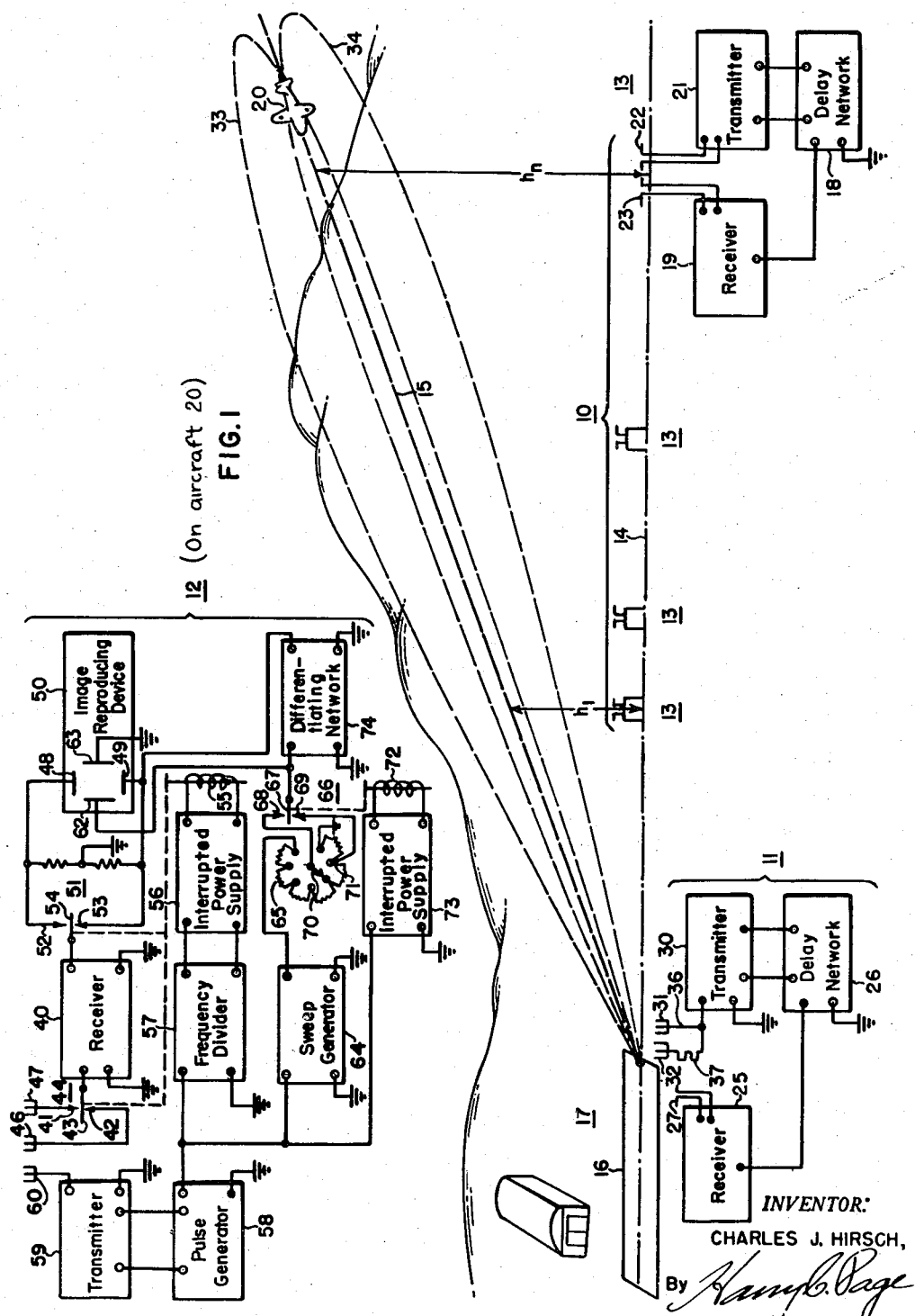
INVENTOR:
CHARLES J. HIRSCH,
By
ATTORNEY.

Oct. 23, 1951 C. J. HIRSCH 2,572,725
PATH-INDICATING SYSTEM FOR MOBILE CRAFT
Filed Feb. 15, 1946 3 Sheets—Sheet 2
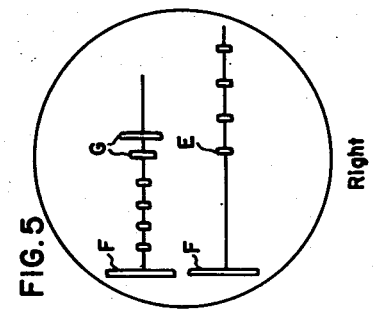
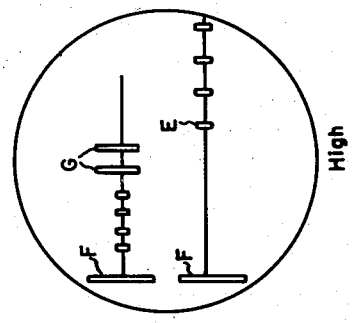
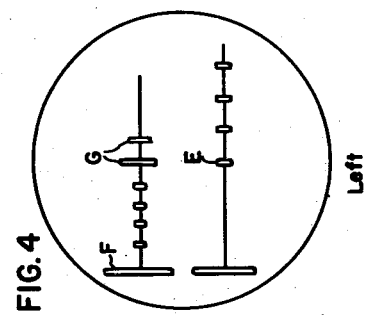
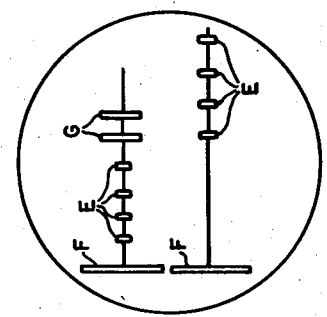
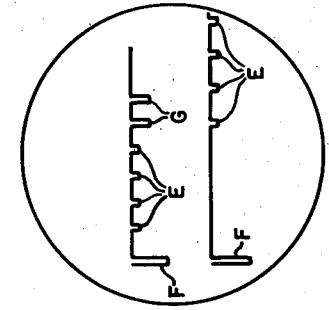
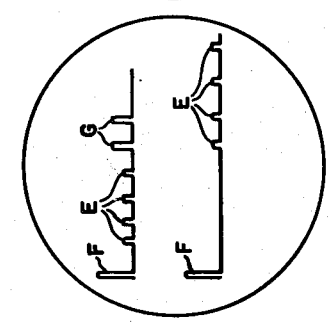
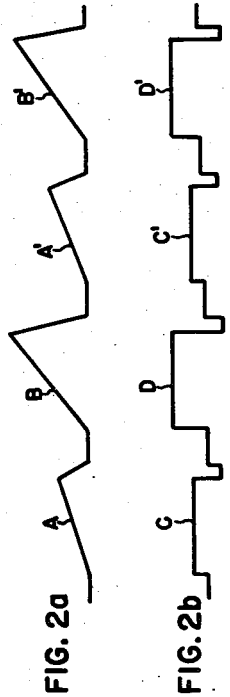
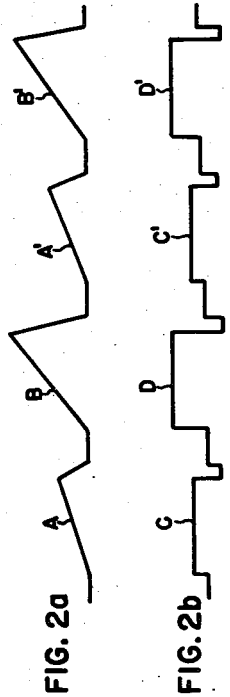
INVENTOR:
CHARLES J. HIRSCH,
BY
ATTORNEY.

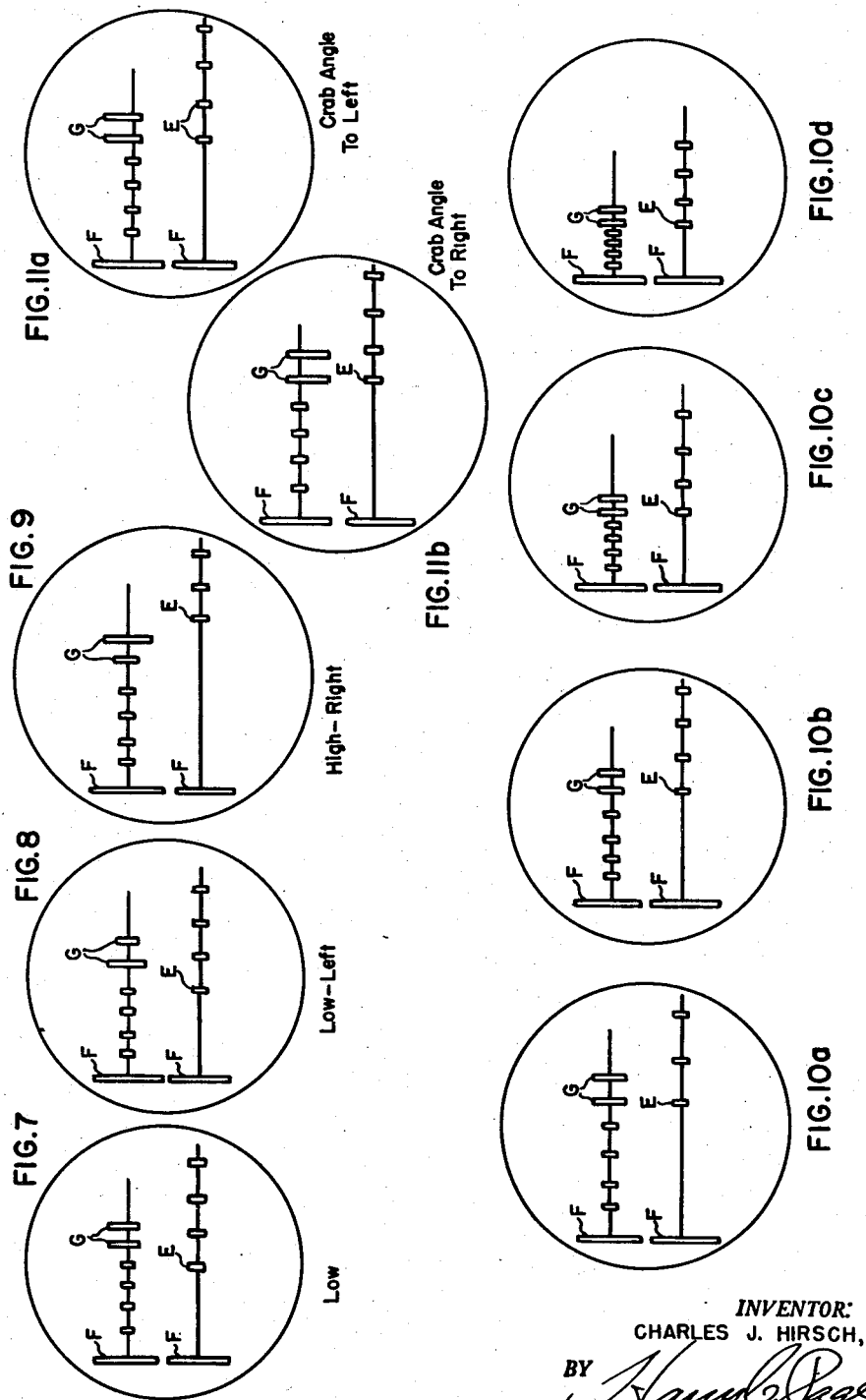

Patented Oct. 23, 1951

2,572,725

UNITED STATES PATENT OFFICE 2,572,725

PATH-INDICATING SYSTEM FOR MOBILE CRAFT

Charles J. Hirsch, Douglaston, N. Y., assignor to Hazeltine Research, Inc., Chicago, Ill., a corporation of Illinois Application February 15, 1946, Serial No. 647,933

2 Claims. (Cl. 343—6)

1

This invention relates to path-indicating systems for mobile craft and especially to such systems in which radiant-energy signals are employed to provide information for use in guiding a mobile craft along a desired path. Such systems have particular utility in connection with the landing of an aircraft on a landing port under conditions of poor or even zero visibility. Accordingly, the present invention will be described in that environment.

Numerous path-indicating systems have been devised to minimize the hazards experienced in landing an aircraft during inclement weather when visibility is reduced. The information utilized by the pilot in landing his aircraft is displayed on one or more instruments; hence such systems are often referred to as instrument-landing systems. In the better known of these systems, wave-signal information which defines electrically the proper glide path is transmitted from the vicinity of the landing port to the aircraft. This information is received on the craft and utilized therein to provide a suitable indication showing when the craft is on the proper path or to afford indications of any lateral deviations of the craft therefrom. Additional wave-signal information which is transmitted from the region of the landing port is also received and utilized on the aircraft making a landing to indicate departures in altitude of the craft from the prescribed glide path. Furthermore, an aircraft descending along the correct glide path is ordinarily supplied at each of two relatively widely spaced positions with wave-signal information from a vertically directed marker beacon. This information is utilized on the aircraft to provide two distinct checks on the altitude of the craft and, hence, to determine the accuracy with which the descent is being made along the glide path.

While such instrument-landing systems are useful in connection with the landing of aircraft under unfavorable weather conditions, they have never proved as satisfactory as desired. The pilot in navigating a craft descending to a landing port with the aid of a system of the type described does not receive continuous information as to the instantaneous altitude of his aircraft above the level of the landing port nor the instantaneous range of the craft to the port. Such information, particularly if it were correlated on a single visual display with the previously mentioned information, would afford the pilot more complete knowledge of the progress of his craft while making an instrument landing, thus supplying him with the sense of distance in the forward and in the downward directions which he customarily exercises in making a proper landing under conditions wherein visibility is more favorable.

In some prior systems of the type described, considerable equipment is often required on the aircraft. For example, some installations require three receivers on the aircraft since the three types of guidance information are transmitted from the landing ports on three distinct frequency bands. Furthermore, a separate altimeter is required on the craft to determine the prescribed altitude at which the descent along the glide path is initiated. This not only undesirably increases the cost of the complete installation required on an aircraft but also increases the volume and weight of the equipment carried thereby. The last-named factor is often particularly unsatisfactory for those applications wherein space and weight limitations are severe.

It is an object of the present invention, therefore, to provide a new and improved path-indicating system for mobile craft which avoids one or more of the above-mentioned disadvantages and limitations of prior path-indicating systems.

It is another object of the invention to provide a new and improved path-indicating system which supplies to an aircraft descending along a prescribed path to a landing port continuous guidance information including the range to, and the height above, the level of the landing port.

It is a further object of the invention to provide a new and improved path-indicating system which supplies to an aircraft descending along a prescribed path to a landing port continuous information as to the height of the craft above the level of the landing port regardless of irregularities in the surface of the terrain below the prescribed path.

It is an additional object of the invention to provide a new and improved path-indicating system which furnishes an airplane descending along a desired path to a landing port continuous guidance information which is visually displayed in a manner which permits quick and accurate comprehension thereof by an observer.

In accordance with the present invention, a path-indicating system for mobile craft comprises a plurality of spaced beacons effectively positioned along a line disposed in predetermined relationship to a desired path for transmitting wave-signal information to a mobile craft in the vicinity of the path. The system also comprises an additional beacon effectively positioned at a landing port for transmitting wave-signal information generally along the aforesaid path to the craft, and a first means on the craft for receiving and utilizing the information transmitted thereto from the additional beacon to indicate the electrical distance of the craft from the effective position of the additional beacon and to indicate lateral deviations of the craft from the path. The path-indicating system further includes a second means on the craft including a pair of spaced directional antennas for receiving and utilizing the individual responses of the directional antennas to the information transmitted from the additional beacon to indicate the crab angle of the craft with reference to the path. The path-indicating system additionally includes a third means on the craft for receiving and utilizing the information transmitted from the beacon nearest thereto to indicate the electrical distance of the craft from the effective position of the nearest beacon on the line, the effective positions of the plurality of beacons on the line being spaced by distances which reduce to an approximate minimum the number of the plurality of beacons required to cause the last-mentioned indicated distance to correspond to the actual distance of the line for all positions of the craft along the path within a maximum allowable predetermined error. The first and third indicating means are also adapted to provide from the first- and second-named wave-signal information a composite correlated indication which shows continuously when each distance is correct for each position of the craft along the path and also to provide continuous indications of vertical and lateral deviations of the craft from the path.

Also in accordance with the present invention, a path-indicating system for mobile craft comprises a plurality of spaced beacons effectively positioned along a line disposed in angular relationship to a desired path for transmitting wave-signal information to a mobile craft in the vicinity of that path. The system also comprises an additional beacon effectively positioned at a landing port for transmitting wave-signal information generally along the above-mentioned path to the craft, and means on the craft for receiving and utilizing the information transmitted thereto from the additional beacon to derive an effect representative of the electrical distance of the craft from the effective position of the additional beacon. The path-indicating system includes means on the craft for receiving and utilizing the information transmitted from the beacon nearest thereto to derive an effect representative of the electrical distance of the craft from the effective position of the nearest beacon on the line. The effective positions of the plurality of beacons on the line are spaced by distances which cause the last-mentioned electrical distance to correspond to the actual distance to the line for all positions of the craft along the path within a maximum allowable predetermined error. The two above-mentioned deriving means are adapted to correlate the effects representative of the electrical distances to show continuously when each distance is correct for each position of the craft along the path.

Also in accordance with the invention, in a wave-signal receiving system for use in a path-indicating system which includes a plurality of spaced beacons effectively positioned along a line disposed in angular relationship to a desired path for transmitting wave-signal information to a mobile craft in the vicinity of the path and effectively spaced by such distances that the electrical distance from the craft at any point on the path to the nearest of the beacons is at all times equal to the electrical distance of the craft from the line within a predetermined maximum degree of error and which includes an additional beacon for transmitting wave-signal information generally along the path, a wave-signal receiving system comprises means for receiving the above-mentioned wave-signal information and means for utilizing the information received from the nearest of the beacons to derive an effect representative of the electrical distance of the craft in the vicinity of the path from the effective position of the nearest beacon. The receiving system also includes means for utilizing the information received from the additional beacon to derive an effect representative of the electrical distance of the craft from the effective position of the additional beacon. The system also includes means responsive to the effects for correlating representations of the electrical distances to show continuously when each distance is correct for each position of the craft along the path.

Also in accordance with the instant invention, a path-indicating system for mobile craft includes a wave-signal receiving means for correlating the indications of the distances as stated above and for providing continuous indications of vertical and lateral deviations of the craft from the path. In accordance with a further feature of the invention, information as to the crab angle of the craft with reference to the desired path is also provided.

For a better understanding of the present invention, together with other and further objects thereof, reference is had to the following description taken in connection with the accompanying drawings, and its scope will be pointed out in the appended claims.

Referring now to the drawings, Fig. 1 is a perspective view of the region in the vicinity of an aircraft landing port showing the general arrangement thereof and a schematic diagram of a complete path-indicating system; Figs. 2a and 2b are graphs representing wave forms which are utilized in explaining the operation of a portion of the system; Figs. 3a, 3b, and 3c represent phases in the development of a typical indication display; Figs. 4 to 9, inclusive, 11a and 11b illustrate typical course indications provided by the Fig. 1 system for various deviations of an aircraft from the desired path; and Figs. 10a, 10b, 10c, and 10d illustrate indications representing correct progress along the desired path.

Referring now more particularly to Fig. 1 of the drawings, there is represented schematically a path-indicating system for mobile craft embodying the present invention in a preferred form. Considered broadly, the system includes a terrestrially located transmitting system 10, a second similarly located transmitting system 11, and a receiving system 12 mounted on a mobile craft such as an aircraft 20. Considering for the moment the transmitting system 10, there are included a plurality of spaced beacons 13 effectively positioned along a line 14 disposed in angular relationship to a desired path 15, the latter being shown in broken-line construction since it may only be determined electrically, as will be more fully described subsequently, for transmitting wave-signal information to the aircraft 20 in the vicinity of the path 15. Line 14 represents an extension of the center line through the usual runway 16 of a landing port 17. The beacons 13 for transmitting wave-signal information to the aircraft 20 are preferably of the transpondor-beacon type and hence are well known to those skilled in the art, so that a detailed description thereof is unnecessary. Briefly, however, each transpondor beacon 13 comprises a receiver 19, the input circuit of which is coupled to an antenna system 23 which may comprise a dipole antenna. The output circuit of the receiver 19 is connected through a suitable delay network 18, which affords a predetermined delay to signals translated thereby, to the input circuit of a transmitter 21. An antenna system 22, which may be a dipole antenna, is connected to the output circuit of the transmitter 21. In order to simplify the drawings and to facilitate the understanding thereof, only the transpondor beacon 13 most remote from the runway 16 is represented in block diagram, the other beacons being represented schematically with dipole antennas mounted thereon. While only a few spaced transpondor beacons have been indicated, it is to be understood that a larger chain thereof is ordinarily required. Transpondor beacons 13 preferably transmit pulse-type signals of relatively short duration.

Transmitting system 11 of the path-indicating system includes an additional beacon, preferably of the transpondor-beacon type and generally similar to any of the beacons 13, effectively positioned at the landing port 17 for transmitting wave-signal information, also preferably of the pulse type, generally along the desired path 15 to the aircraft 20. Transpondor beacon 11 includes a receiver 25 having an antenna system 27 coupled to its input circuit, and an output circuit which is connected to the input circuit of a transmitter 30 through a delay network 28 which has a signal-delay characteristic corresponding generally to that of one of the delay units 18. Antenna system 27 may comprise a dipole antenna.

The transmitter 30 includes means for radiating in individual directions, one on each side of the desired path 15 and with partially overlapping directional characteristics, at least two beams 33, 34 of wave-signal energy, each beam having reference signal-modulation components but with the modulation components of one beam phase-displaced with respect to those of the other. The illustrated overlapping beams 33, 34 are intended to represent a plan view of the developed beams. The above-mentioned radiating means comprise two directional antenna systems 31, 32 including suitable directors and/or reflectors, not shown, to afford desired directional characteristics. Antenna 31 is coupled to transmitter 30 through a relatively short length of transmission line or wave guide 36, while antenna 32 is coupled to the transmitter through a longer transmission line or wave guide 37 which presents a longer time delay to wave-signal information translated thereby. Transmission line 36 preferably includes means for attenuating wave signals translated thereby to compensate for the greater attenuation in transmission line 37 due to the added length thereof, so that the field strengths of beams 33, 34 are substantially equal. This compensation may be effected by a suitable selection of individual transmission lines having different electrical characteristics or by a suitable proportioning of the cross-sectional areas of the wave guides, should the latter be employed.

The receiving system 12 of the position-indicating system comprises means on the aircraft 20 for receiving and utilizing the information transmitted from the beacon nearest thereto to indicate the electrical distance of the craft from the effective position of the nearest beacon on the line. In a preferred form, the system 12 comprises a well-known interrogator-responser system, for example, one of the type disclosed in United States Letters Patent No. 2,415,318, granted February 4, 1947 to Harold A. Wheeler, entitled "Wave-Signal Receiver Arrangement," and assigned to the same assignee as the instant invention. The receiver portion of the interrogator-responsor system comprises a receiver 40, the input circuit of which is connected alternately to individual ones of a pair of directional antennas 46, 47 by means of a switch blade 43 which periodically engages contacts 41, 42 of a switch 44. Antennas 46, 47 are preferably located at symmetrically spaced points in the aircraft 20, for example, in the wings thereof. The output circuit of receiver 40 is connected to the vertical deflecting plates 48, 49 of a line-tracing or image-reproducing device 50 through a switch 51. Switch 51 includes a contact 52 connected to the vertical deflecting plate 48 and a second contact 53 connected to the other vertical deflecting plate 49. A switch blade 54 serves to connect the output circuit of receiver 40 alternately to the contacts 52, 53. Switches 44 and 51 are mechanically interconnected for unicontrol operation, as represented by the broken lines, and are alternately actuated between their two operating positions by an electromagnet 55 which is energized from an interrupted power supply 56. It will be apparent that switches 44 and 51 may be of the inertialess type employing electron tubes rather than of the mechanical variety. The input circuit of power supply 56 is connected through a frequency divider 57, of well-known construction, to one of the output circuits of a modulation-signal source or pulse generator 58. An additional output circuit of pulse generator 58 is coupled to a transmitter 59 which, in turn, is connected to an antenna system 60.

Sweep potentials for application to the horizontal deflecting plates 62, 63 of image-reproducing device 50 are developed by sweep generator 64, the input circuit of which is coupled to an output circuit of pulse generator 58. The receiving system also includes means comprising a voltage divider 65 coupled between the output circuit of sweep generator 64 and a switch 66, the latter having a movable switch blade 67 which is connected to the horizontal deflecting plate 62 of the image-reproducing device 50. Contacts 68 and 69 of switch 66 are connected, respectively, to an adjustable arm 70 and to a fixed tap 71 at the low potential end of the voltage divider 65 so that potentials of unequal value may be applied alternately to the horizontal deflecting plates 62, 63. Switch blade 67 is mechanically connected, as shown by the broken line, to an electromagnet 72 which actuates the blade between its two contact positions. Electromagnet 72 is energized from an interrupted power supply 73, the input circuit of which is connected to an output circuit of pulse generator 58. A differentiating network 74 is connected between switch blade 67 and the vertical deflecting plate 49 of the image-reproducing device 50.

To afford reliable indications of the altitude of aircraft 20 over the level of the runway 16 as it descends substantially along the glide path 15, the effective positions of the beacons 13 on the line 14 are spaced from each other by distances which reduce to an approximate minimum the number of beacons required to cause the distance indicated on the image-reproducing device 50, in a manner presently to be described, to correspond to the actual distance to line 14 for all positions of the aircraft 20 along the path 15 within a maximum allowable predetermined error. This deviation is a fraction comprising the ratio of the difference between the measured height and the true height of the aircraft at a given point in its descent along the path 15 to the true height, it being inherent in the present system that the instantaneous distance between the aircraft and the nearest beacon as the craft descends along the glide path is always a close approximation of the true altitude. When practical navigational considerations for a particular landing port are taken into account and a maximum allowable error is selected, the number of the beacons 13 may be determined, after which it is also necessary to determine their spacing in order to maintain indications within the prescribed allowable error. Since the altitude of the aircraft decreases as it descends on its glide path, it may be demonstrated by geometry that, for constant percent. error, the spacing between successive beacons 13 along the line 14 approaching the runway 16 must similarly decrease. Similarly it may be shown that the number of beacons for a given set of conditions may be established by the equation:

$$n \frac{\log \frac{h_n}{h_1}}{\log (1 + 2.83\sqrt{Da})} \quad (1)$$

where $n$ = number of beacons
$h_n$ = altitude at which controlled glide, i. e., movement of the craft under the influence of the path-indicating system starts
$h_1$ = altitude at which controlled glide ends
$D$ = a fraction comprising the maximum allowable deviation, as previously defined
$a$ = glide angle in radians It may also be demonstrated that the spacing between each beacon 13 of the chain along line 14 may be computed from the equation:

$$d_m = ch_1(1+ca)^{m-1} \quad (2)$$

where $d_m$ = spacing between $m^{th}$ beacon and $(m^{th}+1)$ beacon proceeding in the direction away from the runway from the point at which controlled glide ends. $m = n$ of Equation 1 for the beacon farthest from the runway
$c = 2.83\sqrt{D}$
$D$, $h_1$, and $a$ as in Equation 1

Thus, by utilizing the principles embodied in the foregoing two equations, substantially the minimum number of beacons 13 and the proper distances between each beacon of the chain may be obtained to cause the indicated altitude to correspond to the actual altitude to the line 14 for all positions of aircraft 20 along path 15 within a maximum allowable predetermined error.

Considering now the operation of the described path-indicating system, assume that aircraft 20 has arrived in the vicinity of desired path 15, for example, in the general position indicated in Fig. 1 and that pulse generator 58 is placed in operation by the pilot. This applies a pulse to the modulation-input circuit of transmitter 59 and a pulse-modulated carrier-wave signal is applied to the antenna system 60 from which it is radiated as an interrogating signal. This signal is intercepted shortly thereafter at spaced intervals by the antennas 23 of the receivers 19 of the chain of transponder beacons 13, 13. The modulation components derived in each receiver 19 are applied to its associated delay network 18, whereupon a delayed signal is applied to the transmitter 21 coupled thereto as a modulation pulse to develop a pulse-modulated carrier-wave signal which is radiated by antenna 22.

Interrogating signals generated by the transmitter 59 are also received by the antenna 27 of the receiver 25, and the signal-modulation components derived therein are applied to the delay network 26. The delayed output from network 26 is applied as a pulse-modulated signal to the transmitter 30. The output of the latter is applied simultaneously to each one of the transmission lines 36 and 37. The delay afforded by the longer transmission line 37 is such that two spaced pulse-modulated output signals having a predetermined separation therebetween are developed. As previously mentioned, antennas 31 and 32 have overlapping directional radiation characteristics corresponding to the two beams 33 and 34 of radiant energy. An equi-signal line passing through the intersection of beams 33 and 34 effectively defines the desired path 15 for the aircraft 20, and any lateral deviations of the craft therefrom will be indicated by the image-reproducing device 50 in a manner to be explained hereinafter.

The previously mentioned interrogating signals from transmitter 59 are also intercepted by directional antennas 46, 47 of the receiver 40 on the aircraft 20. Let it be assumed, for the moment, that switches 44 and 51 are momentarily held by the electromagnet 55 so that the input circuit of the receiver 40 is connected to the antenna 47 while the high-potential output terminal of the receiver is connected to the vertical deflecting plate 48. The signal generated by the pulse generator 58 for application to the transmitter 59 is also applied to the sweep generator 64 as a synchronizing signal which keys it into operation, thereby developing a single sweep-voltage wave. Similarly, a synchronizing pulse is also applied to the interrupted power supply 73 thereby to energize electromagnet 72 so as to move switch blade 67 into engagement with contact 69. The single sweep-voltage wave of sweep generator 64 is applied to the voltage divider 65 and a wave of reduced potential is taken from tap 71 for application to the horizontal deflecting plate 62 of the image-reproducing device 50. This sweep voltage is represented by the signal A of Fig. 2a of the drawings. Signal A is also applied to the network 74 and is differentiated thereby to develop the flat top pedestal signal C which is illustrated in Fig. 2b.

In reply to the above-mentioned interrogating signal of transmitter 59, pulse-modulated wave signals are received from each of the transponder beacons 13 and 11 in the order of their respective distances from the transmitter 59. Modulation components are derived by the receiver 40 on aircraft 20 and, when applied during sweep A to the image-reproducing device 50 with the switches 44, 51, and 66 connected in the manner mentioned above, produce the upper display illustrated in Fig. 3a of the drawings. The smaller pulses E, E following the indication of the large initial interrogating pulse F represent the responses from the series of transponder beacons 13, while the paired pulses G, G of intermediate amplitudes represent the replies from the two antennas 31 and 32 of transponder beacon 11.

A second interrogating signal is then transmitted by the airborne transmitter 59 and responses from the ground transponder beacons are received on aircraft 20 shortly thereafter. Simultaneously, with transmission of the second interrogating signal, a second synchronizing pulse is applied by pulse generator 58 to the sweep generator 64 and to the interrupted power supply 73. As a result thereof, electromagnet 72 is operated to move switch blade 67 into engagement with contact 68, thereby applying a sweep signal B (Fig. 2a) of greater amplitude to the horizontal deflecting plate 62. Thus, pulse generator 58 functions as a means for maintaining the reference time-base sweep of sweep generator 64 synchronized with relation to the transmission of the interrogating wave signals. Sweep signal B is also applied to the network 74 and is differentiated thereby to develop the pedestal pulse D which is illustrated in Fig. 2b. Pedestal pulse D is applied to the vertical deflecting plate 49. During the period of sweep signal B, switches 44 and 51 remain in their initial positions since frequency divider 57, which controls the interrupted power supply 56, is responsive only to every third synchronizing pulse from the pulse generator 58. Consequently there appears on the screen of image-reproducing device 50, during the interval of the sweep signal B, the lower display which is illustrated in Fig. 3a. Since sweep potential B is greater in magnitude and rises more steeply than sweep signal A, only the responses from the nearby transponder beacons 13 are displayed during the interval of the effective portion of sweep potential B. The purpose of this operation will be made clear hereinafter.

When the next interrogating signal is transmitted by transmitter 59, a synchronizing signal is applied to the frequency divider 57 by pulse generator 58. This signal, following the two preceding synchronizing signals, is effective to develop an output signal in divider 57, which signal is applied to the interrupted power supply 56. The latter controls electromagnet 55 in a manner to connect the input and output circuits of receiver 40, respectively, to contacts 42 and 53. Reply signals from the transponder beacons intercepted by antenna 46 in response to the last interrogation are demodulated by receiver 40 and are now applied with positive polarity to the lower deflecting plate 49 of the image-reproducing device 50. During this interval, sweep generator 64 in combination with the voltage divider 65 and the switch 66 which is operatively connected to tap 71, apply the sweep potential A', illustrated in Fig. 2a, to the horizontal deflecting plate 62. A pedestal pulse C' is simultaneously applied to the vertical deflecting plate 49. Accordingly, the pattern represented at the upper portion of Fig. 3b is displayed at this particular instant by the image-reproducing device 50. The next interrogating signal from interrogator-responsor 12 results in the movement of switch 66 to its other operating position wherein blade 67 engages contact 68 so that generator 64 applies the wave B' of Fig. 2a to the horizontal deflecting plate 62 and the pedestal pulse D' to plate 49. For this brief interval the pattern represented at the lower portion of Fig. 3b is displayed by the image-reproducing device 50 and, as previously explained, does not include the response from the transpondor beacon 11.

It will be understood, however, that due to the high repetition rate of the interrogating signals from interrogator-responsor 12, the related sweep frequency of generator 64, the persistence of vision of the operator, and the persistence of the screen of the image-reproducing device 50, the display will actually appear to an observer as represented in Fig. 3c. The representations of Figs. 3a and 3b, however, are useful in understanding the operation of the interrogator-responsor 12.

As shown in Fig. 3c, the upper display may be used to determine the range of the aircraft 20 to the runway 16. This distance may be determined by the separation between the indication of the interrogating pulse F and the first received of the reply pulses G from unit 11. The separation between pulses F and G is proportional to the instantaneous round-trip propagation time between the plane 20 and unit 11 in addition to any fixed system delays such as those afforded by the delay network 26. The screen of image-reproducing device 50 is preferably calibrated to indicate the correct distance in any convenient units. In the lower display of Fig. 3c, the separation between the displayed interrogating pulse F and first pulse E, which represents response from the transpondor beacon 13 nearest to the aircraft 20, indicates the instantaneous height of the aircraft within a maximum allowable predetermined error. The delayed responses from the more remote beacons 13 have no particular significance to the observer; consequently they may ordinarily be ignored.

In the path-indicating system under consideration, the range and the altitude of craft 20 are correlated for each position of the craft along the path 15 by displaying the first of the range-indicating pulses G vertically aligned with the first of the altitude-indicating pulses E. This correlation is achieved by making the sweep velocity or potential applied to horizontal deflecting plates 62, 63 during a display of altitude equal to the sweep velocity during a display of range times the factor $$\frac{1}{\sin a}$$

where $a$ represents the angle which path 15 forms with line 14. In other words, the sweep velocity during a display of altitude is established from the sweep velocity during a display of range by multiplying the latter velocity by a factor equal to the range at any instant divided by the corresponding altitude at that instance. When this relation is established in the above-described system, the range and altitude indications of an aircraft descending at a constant glide angle to a landing port can be made to move in synchronism across the screen of the image-reproducing device 50 to the reference or interrogating pulse F.

The foregoing relation is established by the voltage divider 65 which performs the function of adjusting the magnitudes of the sweep potentials applied to the image-reproducing device 50 on alternate sweeps to separate and to correlate the indications of range and altitude, thereby to show continuously when each distance is correct for each position of the aircraft 20 along the glide path 15. Fixed tap 71 on the voltage divider, in conjunction with the adjustable arm 70 thereof, provides the proper sweep potentials on alternate sweeps of the generator 64 to the horizontal deflecting plates 62, 63 to achieve this result. Voltage divider 65 preferably is tapped at a plurality of predetermined points so that the selective engagement of adjustable arm 70 with one of these taps will apply to the horizontal deflecting plates 62, 63 the proper voltage for any selected one of a plurality of glide angles.

It will be apparent that switch 66 comprises a switching means coupled to the sweep generator 64 for applying different sweep potentials to the image-reproducing device 50 on alternate sweeps of the foregoing generator to correlate the indications of range to the runway and height of the plane 20 thereabove, thereby to show continuously when each distance is correct for each position of the aircraft along the path. It will also be seen that the differentiating network 74 comprises a means coupled to the line-tracing device 50 for displacing predetermined lines traced thereby to align and to correlate the indications of the distances under consideration, thereby to show continuously when each distance is correct for each position of the craft 20 along the path 15.

Since the two beams 33, 34 which are radiated from antennas 31, 32 are highly directional, it will be apparent that for any lateral deviations of aircraft 20 from the desired equi-signal path 15, the modulation components derived from each beam will have unequal amplitudes. Hence, the first or left-hand pulse G of Fig. 4 which, under the assumed conditions, represents the demodulated signal derived from the left-hand directional antenna coupled to transmitter 30, as viewed from aircraft 20, will have a greater amplitude than the demodulated signal derived from the right-hand antenna. Accordingly, the pilot will be informed that his plane is to the left of the desired path. The Fig. 4 display will also indicate to the pilot that his altitude is proper for his range to the runway 16 since the first range pulse G in the upper or range trace is vertically aligned with the first altitude indicating pulse in the lower or altitude trace.

Fig. 5 represents the type of display present on the screen of the image-reproducing device 50 when aircraft 20 has deviated laterally to the right of the glide path 15. It will be observed that the second or right-hand pulse G which was derived from the signal received from the right-hand antenna of transmitter 30 of the transpondor beacon 11 now is larger due to the greater response therefrom. However, the height of the plane is correct for the range of that moment.

Fig. 6 illustrates the type of display present when the described aircraft is flying too high for the particular range to the runway 16. The first height-indicating pulse E appears to the right of the first range-indicating pulse G. Conversely, the display represented in Fig. 7 indicates that the aircraft is flying below the glide path for the range to the runway 16 so that the first height-indicating pulse E is just to the left of the first range-indicating pulse G. Figs. 8 and 9 are displays representing two types of deviations from the glide path. From the discussion of the previous displays, it will be readily apparent from an examination of Fig. 8 that the aircraft is represented as low and to the left of the desired glide path, while the information on the Fig. 9 display indicates that the aircraft is high and also to the right of the glide path.

Figs. 10a-10d, inclusive, represent the type of displays afforded by image-reproducing device 50 when the aircraft is descending properly along the glide path. It will be noted that the range-indicating pulse G and the height-indicating pulse E approach the reference pulse F at the same rate. Since the two pulses G have the same amplitude in each display, the aircraft is not deviating laterally from the desired glide path.

Alternate ones of the directional antennas 46 and 47 are connected to the receiver 48 of the interrogator-responsor 12 on every third sweep of the sweep generator 64, as previously explained. Since these antennas are located at symmetrically spaced points on aircraft 20, their responses to reply signals from the transpondor beacon 11 will result in range signals which are symmetrical above and below their horizontal trace, as illustrated in Figs. 3c, 4-9, inclusive, and 10a-10d, inclusive, only when the longitudinal axis of the aircraft is substantially aligned with the glide path. However, when the foregoing axis is disposed transversely of the glide path, as when side winds are holding the aircraft at an angle with the path even though the craft is descending along the glide path, unequal responses by the antennas 46, 47 on the craft to the signals transmitted by the transpondor beacon 11 will prevail. Since the operation of switch 51 causes information from one of the antennas 46, 47 to appear above the horizontal trace and the information from the other end antenna to appear below the horizontal trace, an angular departure of the type mentioned above of the aircraft from the glide path, popularly referred to as the "crab angle" of the craft, will result in indications similar to those shown in Figs. 11a and 11b. When the aircraft is disposed at a crab angle to the left, the range pulse G will project to a greater degree above the horizontal trace as represented in Fig. 11a. The Fig. 11b display indicates a crab angle of the opposite sense to the one just described.

Such crab angle information is useful since the pilot is enabled thereby to adjust his craft just prior to contacting the runway so that the aircraft upon landing will travel longitudinally of the runway and not at an angle thereto, which might carry the aircraft diagonally off the runway and result in serious mishap.

From the foregoing explanation of the operation of the path-indicating system, it will be apparent that switch 44 comprises a switching means coupled to the directional antennas 46, 47 and the receiver 48 alternately to translate to the image-reproducing device 50 information received from individual ones of antennas 31, 32 of transpondor beacon 11 to indicate crab angle of the aircraft 20 with respect to the path 15.

The path-indicating system has previously been described in connection with an aircraft descending along a predetermined glide path. However, it is possible for a pilot to select substantially any glide path he may desire or to alter his glide path almost at will during his descent by moving the adjustable arm 70 to a new setting on the voltage divider 65. Movement of the arm 70 away from the fixed tap 71 is effective to select a smaller glide angle. For a given number of beacons 13 in a given setup under the glide path, more accurate altitude information is provided when an aircraft descends at an angle greater than the glide angle for which the system was laid out.

From an examination of the transpondor beacon 13 illustrated schematically in Fig. 1 of the drawings, it will be apparent that predetermined additional time delays to wave signals translated thereby may be incorporated into one or more of the delay networks 18 to compensate for the possible necessity of positioning a beacon 13 on a building or on a natural elevation. This added delay will correspond to the time of travel for a wave signal making a round trip between the elevated point containing the beacon and the level of the landing port or runway. Thus the pilot of the aircraft may, at all times, receive information indicating his absolute altitude over the runway regardless of surface irregularities in the terrain below the glide path. Furthermore, by incorporating other delay factors in individual ones of the delay network 18, some of the beacons 13 may be moved when circumstances require as, for example, when a body of water is located at a position where one of the beacons ordinarily would be placed. Reliable altitude information still would be afforded within a maximum allowable predetermined error when the proper time delay was established for the delay network 18. Similarly, predetermined delays may be incorporated in the system of transpondor beacon 11 to alter the effective position thereof with respect to the runway 16.

From the above description of the invention, it will be apparent that relatively simple and compact equipment is required throughout the system. No co-operation is required from ground personnel although, if desired, the system periodically may be monitored easily to check the performance of the various units thereof. An additional feature of the system resides in the fact that the interrogator-responsor unit in the aircraft may also be employed for air navigation with associated ground radar beacons and also may be used for anti-collision protection from other aircraft when the latter are equipped with beacons of the transpondor type. The type of display afforded by the image-reproducing device 50 is also advantageous since a quick visual inspection thereof by a pilot of a descending craft provides him with easily interpreted and continuous information as to the height above and the range to the landing port, lateral and vertical deviations of the craft from the glide path, and also crab angle indications.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A path-indicating system for mobile craft comprising: a plurality of spaced beacons effectively positioned along a line disposed in angular relationship to a desired path for transmitting wave-signal information to said mobile craft in the vicinity of said path; an additional beacon effectively positioned at a landing port for transmitting wave-signal information generally along said path to said craft; a first means on said craft for receiving and utilizing the information transmitted thereto from said additional beacon to indicate the electrical distance of said craft from the effective position of said additional beacon and to indicate lateral deviations of said craft from said path; a second means on said craft including a pair of spaced directional antennas for receiving and utilizing the individual responses of said directional antennas to the information transmitted from said additional beacon to indicate the crab angle of said craft with reference to said path; and a third means on said craft for receiving and utilizing the information transmitted from the beacon nearest thereto to indicate the electrical distance of said craft from the effective position of said nearest beacon on said line, the effective positions of said plurality of beacons on said line being spaced by distances which reduce to an approximate minimum the number of said plurality of beacons required to cause said last-mentioned indicated distance to correspond to the actual distance to said line for all positions of said craft along said path within a maximum allowable predetermined error, said first and third indicating means being adapted to provide from said first- and second-named wave-signal information a composite correlated indication which shows continuously when each distance is correct for each position of said craft along said path and also to provide continuous indications of vertical and lateral deviations of said craft from said path.

2. A path-indicating system for mobile craft comprising: a plurality of spaced beacons effectively positioned along a line disposed in angular relationship to a desired path for transmitting wave-signal information to said mobile craft in the vicinity of said path; an additional beacon effectively positioned at a landing port for transmitting wave-signal information generally along said path to said craft; a first means on said craft including an image-reproducing device for receiving and utilizing the information transmitted thereto from said additional beacon to indicate the electrical distance of said craft from the effective position of said additional beacon and to indicate lateral deviations of said craft from said path; means including a pair of spaced directional antennas for receiving the information transmitted from said additional beacon; switching means coupled between said antennas and said receiving means alternately to translate to said image-reproducing device the information received from individual ones of said antennas to indicate the crab angle of said craft with respect to said path; and a second means on said craft including said image-reproducing device for receiving and utilizing the information transmitted from the beacon nearest thereto to indicate the electrical distance on said craft from the effective position of said nearest beacon on said line, the effective positions of said plurality of beacons on said line being spaced by distances which reduce to an approximate minimum the number of said plurality of beacons required to cause said last-mentioned indicated distance to correspond to the actual distance to said line for all positions of said craft along said path within a maximum allowable predetermined error, said first and second indicating means being adapted to provide from said first- and second-named wave-signal information a composite correlated indication which shows continuously when each distance is correct for each position of said craft along said path and also to provide continuous indications of vertical and lateral deviations of said craft from said path.

CHARLES J. HIRSCH.

REFERENCES CITED

The following references are of record in the file of this patent:

UNITED STATES PATENTS

| Number | Name | Date |
|---|---|---|
| 2,034,520 | Leib | Mar. 17, 1936 |
| 2,097,072 | Lock | Oct. 26, 1937 |
| 2,132,599 | Bauman | Oct. 11, 1938 |
| 2,171,293 | Plastino | Aug. 29, 1939 |
| 2,176,469 | Moueix | Oct. 17, 1939 |
| 2,252,083 | Luck | Aug. 12, 1941 |
| 2,372,620 | Williams | Mar. 27, 1945 |
| 2,395,854 | Ferrill | Mar. 5, 1946 |
| 2,396,112 | Morgan | Mar. 5, 1946 |
| 2,405,238 | Seeley | Aug. 6, 1946 |
| 2,414,469 | Isbister | Jan. 21, 1947 |
| 2,415,318 | Wheeler | Feb. 4, 1947 |
| 2,417,032 | Wolff | Mar. 4, 1947 |
| 2,421,017 | Deloraine | May 27, 1947 |
| 2,433,381 | Marchand | Dec. 30, 1947 |